United States Patent [19]

Brossy

[11] Patent Number: 4,992,227
[45] Date of Patent: Feb. 12, 1991

[54] PROCESS FOR OBTAINING A MINERAL FIBER BASED SURFACED PANEL

[75] Inventor: Pierre Brossy, Chalon Sur Saone, France

[73] Assignee: Isover Saint-Gobain, Courbevoie, France

[21] Appl. No.: 453,854

[22] Filed: Dec. 20, 1989

[30] Foreign Application Priority Data

Dec. 21, 1988 [FR] France .................. 88 16895

[51] Int. Cl.$^5$ .................. C03B 23/20; B32B 17/12
[52] U.S. Cl. .................. 264/112; 65/3.43; 65/4.4; 65/9; 156/62.2; 264/109; 264/121; 264/518
[58] Field of Search .......... 264/518, 112, 119, 109, 264/121; 156/62.2; 65/4.4, 9, 3.43

[56] References Cited

U.S. PATENT DOCUMENTS 2,997,096 8/1961 Morrison .................. 156/381
3,082,143 3/1963 Smith .................. 156/229
4,632,685 12/1986 Debouzie et al. .................. 65/9

FOREIGN PATENT DOCUMENTS 1119373 3/1982 Canada.
1150659 4/1969 United Kingdom.

Primary Examiner—Marylynn Fertig Theisen
Attorney, Agent, or Firm—Oblon, Spivak, McClelland, Maier & Neustadt

[57] ABSTRACT

A process for manufacturing mineral wool products according to which the mineral wool is collected to form a mattress on a conveyor belt, carried to a conforming and binder polymerizing chamber consisting of two complementary calibrating and transport conveyors consisting of a plurality of articulated perforated elements of pallet type. The speeds of the two conveyors are different, the difference in speed corresponding along the entire length of the chamber to a staggering of a length equivalent to at least the width of one pallet so that one of the faces of the mattress is smoothed during conformation of the mineral wool product.

8 Claims, 1 Drawing Sheet

PROCESS FOR OBTAINING A MINERAL FIBER BASED SURFACED PANEL

DISCUSSION OF THE BACKGROUND

1. Field of the Invention

The subject of the invention relates to a process for obtaining a surfaced panel based on mineral fibers, particularly so-called insulating glass fibers. It applies particularly to the manufacture of soundproofing and/or thermal insulation panels comprising a covering on one face left exposed after assembly, for example such as panels for the ceilings of industrial or commercial premises.

Such a panel generally consists of a layer of mineral fibers, such as glass fibers bound by an organic binder onto which is glued on the exposed side, a layer of cladding intended to give it a decorative finished appearance. Depending on the desired degree of finish, the dampness of the rooms or the degree of soundproofing desired, this cladding layer is of the polyvinyl chloride film type, a skin of glass fibers perhaps painted to perfect its decorative appearance, an aluminum skin laid on cardboard and able to be covered with a coat of paint, or any other material known to this art.

Inasmuch as these panels serve as decor and even if their use is generally limited to rooms whose ceiling height is, for example, in excess of 10 meters, the appearance of the panel is particularly important, therefore the formation of unattractive creases must be particularly avoided. In addition, for a good lifespan of the material, it is also important to avoid any blistering where the cladding starts to come away. This condition therefore requires that the surface condition of the base layer be sufficiently smooth before gluing the cladding layer.

2. Description of the Related Art

However, as indicated earlier, this base layer is a layer of compressed glass wool, whose thickness is generally between 10 and 100 mm, inclusive. The process for obtaining this base layer is common to most insulating products in glass wool and comprises, for example and in a known manner, the following stages: glass in the molten state is continuously brought near to the peripheral wall of a centrifuge revolving at high speed in such a manner that under the effect of the centrifugal force, the molten glass is ejected through the orifices to the outside of the centrifuge in the form of radial filaments which are immediately drawn out into fibers by a gas current circulated in a ring at high speed and high temperature by a blowing crown placed just above the peripheral wall of the centrifuge, the gas current having a direction essentially perpendicular to the direction of filament emission. For basalt rock or slag based fibers, the so-called free centrifugation fiber forming process is preferably used. In both cases, the composition of size based on a thermosettable resin is sprayed onto the fibers which are then collected by a collection device consisting, for example, of an endless conveyor belt.

Even if one uses devices intended to make the fiber distribution uniform, the mattress obtained is never of rigorously constant thickness and some of the unevennesses created can be found on the finished product. In addition, the mattress of fibers is then taken to a forming device in which it is compressed and polymerization of the binder is initiated. Compression and conveyance of the mattress are obtained in a heated chamber with forced circulation of gas currents by means of two complementary calibrating conveyors formed, for example, of a succession of pallets hinged together and equipped with perforations for the smoke to pass through. In addition, given that in this forming stage it is desired to reduce the thickness of the mattress by a factor generally between 3 and 10, inclusive, these pallets must be sufficiently rigid to confer upon them a high mechanical strength enabling them to withstand the opposing pressure exerted by the mineral fiber mattress. It results from these different considerations that the dimensions of the pallets are mandatorily chosen within relatively narrow limits, the width being typically from 10 to 25 cm, inclusive. In addition, as the calibrating conveyors are of the endless belt type, there is always a degree of play between the pallets to allow their rotation. Also, due to wear of the pallets or simply the difficulty of very precise adjustment, the pallets are never accurately aligned and are therefore not all at the same height. On the finished product, these various irregularities result in marks in the form of steps. When applying the cladding, the effective gluing surface is limited to the "high" steps which does not enable satisfactory gluing and also, as the layers of cladding used are very thin, these "steps" are visible even on the finished product.

To remedy this defect, it is known that the surface of the mineral wool base layer can be rectified by planning to give it a smooth and even surface. However, this planning has major disadvantages. Firstly, it is not possible to effect this on line directly on the continuous belt delivered by the production installation, and secondly, during planning some of the thickness of the product, for example, 1 to 3 cm, inclusive, is removed which of course poses the problems of waste, but also deprives the panel of the mechanical reinforcement factor provided by the outer crust, always a little denser than the rest of the product.

SUMMARY OF THE INVENTION

Accordingly, an object of this invention is to provide a novel process for obtaining a smooth and even surface on a mineral wool product which does not have the above-mentioned disadvantages, i.e. does not destroy the surface crust created during forming of the product and which is applicable directly on line.

The present invention relates to a process for manufacturing mineral glass products comprising the steps of: spraying mineral wool with a thermosettable organic binder; placing the sprayed mineral wool on an endless conveyor belt; forming the sprayed mineral wool into a mattress; transporting the mineral wool mattress on the conveyor belt to a binder conforming polymerization chamber, wherein the conforming and polymerization chamber comprises two complementary calibrating and transport conveyors and a hot gas current circulation means for circulating hot gas through said mineral wool mattress; compressing the mattress between the conveyors while the mattress is within the conforming and polymerization chamber, the calibrated and transport conveyors comprising a plurality of pallet type articulated perforated elements; driving the two calibrating and transport conveyors at different speeds, the difference in speed between the two conveyors corresponding along the length of the conforming and polymerization chamber, to a staggering of a length equivalent to at least the width of one of the pallets, so that one of the faces of the mattress is smoothed during conformation of the mineral wool product; and removing the mineral glass product from the conforming and polymerization chamber.

The effect of this measure is to differentiate between the two surface conditions of the mattress during conforming by a differentiation of the two conveyors, one of which becomes the leading conveyor—which determines the speed of the line—and the other the smoothing conveyor. According to one method of realizing the invention, the lead conveyor is the faster conveyor, the side of the felt in contact with it having a rougher surface, whereas on the slower conveyor side, one notices surface smoothing with slight drawing out of the fibers. By choosing to smooth on the fast conveyor side, the formation of creases is avoided, especially when the side of the felt to be smoothed is provided with a covering such as a glass fiber skin conforming to a preferred mode of the invention. This process therefore derives an advantage from the surface state of the mattress not being finally set before complete polymerization of the binder. In compliance with one of the objectives of the invention, smoothing is thus obtained without removing the surface layer forming the outer crust.

The speed ratio of the two calibrating conveyors is a feature of the invention. From a purely theoretical point of view, it can be calculated that smoothing of the surface is likely to be obtained if the equivalent stagger length corresponds, for example, to half a pallet. However, if one considers the fact that the conforming and binder polymerization chamber or oven has a typical length of 15 meters, that the conveyors advance at a speed of approximately 10 m/s, and lastly, that the pallets are, for example, approximately 15 cm wide, it is calculated that a speed variation equivalent to one pallet's width staggering signifies a difference of less than 5% between the speeds of the two calibrating conveyors. It is obvious that if one tries to reduce this difference significantly, one then reaches limit values from the point of view of the precision of the speeds and control of the conveyors, limits that can be fixed, for example, at a minimum difference of 2%. In addition, it is generally neither desirable nor useful to stagger the two conveyors by a length equivalent to more than, for example, 4 pallets; beyond this one reaches a mechanical limit due to conveyor motors drive problems by virtue of the very high friction forces created by the high speeds.

This measure associated with simple adjustment of the calibrating and transport drive motors can be accompanied by other measures which improve the smoothing effect obtained. One can thus accentuate the phenomenon of adherence on the slower conveyor by making sure to establish forced circulation of the gases through the mattress so that at least in the first part of the oven, where the surface crust proper is formed, the gases penetrate the mineral wool mattress via the face which is against the smoothing conveyor and escape via the lead and therefore faster conveyor. In this way, on one side the fibers tend to become incrusted into the orifices of the pallets, and afterwards one finds the marks of these orifices on this hidden face of the product after the panel is mounted, whereas on the contrary they are drawn out on the opposite face which is smoothed.

In another embodiment of the invention already mentioned earlier, the face of the mattress that is to be smooth is clad with a covering before the mattress enters the polymerization oven whose calibrating and transport conveyors are adjusted as previously. To suit implementation of the process according to the invention, a covering must have various qualities, in particular, a high tensile strength in order to impose upon it a certain tension encouraging a smooth final appearance, a porosity sufficient not to hinder circulation of the hot gas current through the mattress, and a sufficiently high temperature stability for it to withstand the temperature reigning in the oven without deterioration. These requirements are satisfied with a skin of textile glass fibers, fixed to the mineral wool mattress in the conforming and polymerization chamber by the binder itself contained within the chamber. One can thus use a skin of glass fibers obtained by the wet method according to a technique similar to paper manufacturing techniques based on glass fibers mechanically and continuously drawn in the form of threads cut at a later stage. One can also use a skin of glass fibers obtained by the dry method, for example, complying with the teaching of publication FR-A-2 519 036. The substance of the glass fiber skin can be chosen from among the lowest gsm substances on the market, either, for example, a skin 0.5 mm thick for a substance of between 35 g/m2 to 80 g/m2. Denser skins improve the rigidity of the panel but are more expensive.

The smoothing obtained is additionally improved by combining the use of such a skin with a choice of gas circulation direction complying with that indicated earlier.

In addition to the first aspect of smoothing one face of the mineral wool mattress, the skin advantageously confers a certain mechanical reinforcement to the product which complements that of the two surface layers richer in organic binder since they have been slightly compressed. In addition, it facilitates gluing of the decorative cladding applied subsequently, for it is slightly less porous than the mineral wool mattress, which enables using smaller quantities of glue.

In certain cases, one may wish both faces of the mattress to be covered with a glass fiber skin. In this case, the skin on the "unsmooth" side will preferably be glued in a separate operation after the binder polymerization chamber and not brought into contact with the mattress from the outset, in order to avoid the risk of driving the mineral wool mattress by both conveyors alternately due to the insufficient rugosity of the two cladded faces. Work is possible directly on line, however, by adjusting the hot gas circulation as indicated previously.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1A:
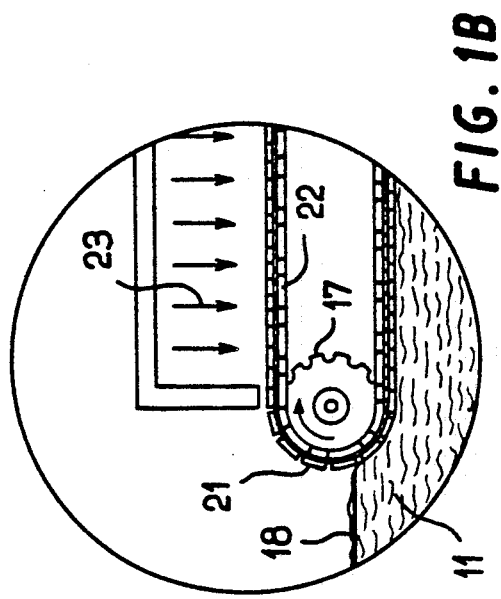
FIGS. 1A and 1B shows a production line for glass wool based insulation panels.
Figure 1B:
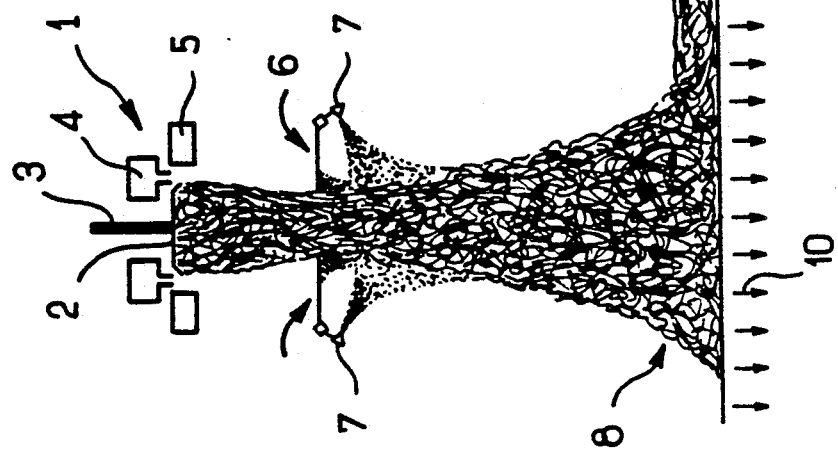

A line such as this consists of a fiber forming unit 1, in itself perfectly well known, comprising one or more centrifuges 2 consisting of a part in the form of a plate deck, the peripheral wall of which is equipped with a large number of orifices through which escapes in the form of a multitude of filaments the molten glass brought by a jet 3 coming from a melting oven not shown here. The centrifuge 2 is surrounded by a series of ring burners 4 which create around the periphery of the peripheral wall a high speed gas current having a sufficiently high temperature to draw out the glass filaments into fibers. Heating means 5, for example, of induction type, additionally serve to keep the glass and the centrifuge at the correct temperature. Under centrifuge 2, the fibers form a torus closed by the induced air diagrammatically represented by arrows 6. This torus is encircled by a size spraying device 7 containing the binder in aqueous solution.

The bottom of the fiber forming oven is closed by a fiber collecting device 8 which comprises, for example, a conveyor 9 formed by a water permeable endless belt under which are set suction chambers (arrows 10) for excess fumes and aqueous compositions. Therefore, on conveyor 9 a glass wool mattress is formed which is taken to the conforming and polymerization enclosure 12. This enclosure 12 consists of a closed chamber or a series of pressurized boxes supplied by hot air burners circulated by fans. Two complementary calibrating and transport conveyors 13, 14 cross through the enclosure, these conveyors 13 and 14 are rotated by motors placed in pits 15, 16 and consist according to the teaching of French patent 2 394 041 of a succession of rigid perforated pallets hinged together. At the same time as these conveyors ensure passage of the hot gases encouraging rapid setting of the binder, they compress the mattress to give it the desired thickness which for a ceiling panel is typically between 20 to 100 mm, inclusive, the density of the glass wool layer being, for example, between 20 to 80 kg/m3.

As indicated in the partially enlarged view, conveyors 13 and 14 consist of a series of pallets 21, fixed onto a chain 22 meshing onto pulleys 17. For the rotation, it is necessary to preserve a degree of play between the different pallets 21. Also, wear or fouling can occur which leads to the replacement of some pallets so that after a certain production time, conveyors 13 and 14 no longer define strictly even surfaces and after conforming, the mattress may keep the imprint of these faults.

To remedy this and produce panels whose face subsequently covered with an exposed cladding is relatively smooth, the bottom conveyor 14, for example, is driven faster than the top conveyor 13. For an oven 15 meters long, very good results have, for example, been obtained with a difference in speed of approximately 3%, corresponding to approximately twice the width of the perforated pallets.

The smoothing effect is improved even more by covering the relevant face of the mattress with a skin of textile glass fibers 18 paid off a roll 19 and applied by a press roller 20 onto the mattress shortly before its entry into chamber 12. In the method of realization presented here, the skin 18 is applied onto the top face of the mattress but it is also possible to place it directly onto conveyor 9 in order to collect the glass fibers directly onto the skin in the fiber forming hood; in this case, the speed ratio of the two conveyors is reversed.

In addition, on the rapid conveyor side—which defines the speed of the line and therefore serves as the leader—one can advantageously improve the roughness of the felt by circulating the oven gases in such a way that they penetrate into the product on the side to be smoothed as arrows 23 indicate. It should be noted that beyond the first section of the oven, as soon as the "outer crust" is formed, one can reverse the direction of circulation of the gases as is well known for ovens in this art. Upon leaving oven 12, the smooth face covered with the glass skin 18 is, for example, provided with a surface covering, the skin facilitating this operation, for it is less porous than the insulating layer. The mattress thus prepared is then cut into panels of the required dimensions and then packaged into batches.

Obviously numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Process for manufacturing mineral glass products, comprising the steps of:
    spraying mineral wool with a thermosettable organic binder;
    placing said sprayed mineral wool on an endless conveyor belt;
    forming said sprayed mineral wool into a mattress;
    transporting said mineral wool mattress on said conveyor belt to a binder conforming and polymerization chamber, wherein said conforming and polymerization chamber comprises two complimentary calibrating and transport conveyors and a hot gas current circulation means for circulating hot gas through said mineral wool mattress;
    compressing said mattress between said conveyors while said mattress is within said conforming and polymerization chamber, said calibrating and transport conveyors comprising a plurality of pallet type articulated perforated elements; and
    driving the two calibrating and transport conveyors at different speeds, the difference in speed between said two conveyors corresponding along the length of said conforming and polymerization chamber, to a staggering of a length equivalent to at least the width of one of said pallets, so that one of the faces of the mattress is smoothed during conformation of the mineral wool product.

2. Process according to claim 1, wherein the difference in speed of the two conveyors corresponds to a staggering of a length equivalent to at least 4 times the width of one of said pallets.

3. Process according to claim 1 or 2, wherein the faster conveyor is the conveyor driving the product which is smoothed on the side of the slower conveyor.

4. Process according to claim 3, wherein in a section of said chamber adjacent its entry, the direction of hot gas current circulation is such that the hot gas current penetrates into the product on the side of the slower calibrating and smoothing transport conveyor.

5. Process according to claim 4, wherein the face of the mattress intended to be smoothed is covered with a porous traction resistant cladding before said mineral wool mattress enters the conforming and polymerization chamber.

6. Process according to claim 4, wherein said cladding is a glass fiber skin.

7. Process according to claim 6, wherein said manufactured mineral glass products comprise a decorative covering on one face.

8. Process according to claim 1, comprising the further step of removing said mineral glass product from said conforming and polymerization chamber.

* * * * *